J. EDSON & W. H. HAYNES.

Assignors to H. LOUD.

Anti-Frictional Sheave for Pulley-Blocks, &c.

No. 8,997. Reissued Dec. 16, 1879.

Witnesses.

Geo. B. Kelly.
W. S. Pellow.

Inventors.

J. Edson, and
W. H. Haynes
Per Brown Bros.
Attorneys.

UNITED STATES PATENT OFFICE.

JACOB EDSON, OF BOSTON, AND WARREN H. HAYNES, OF SUDBURY, ASSIGNORS TO HERBERT LOUD, OF EVERETT, MASSACHUSETTS.

IMPROVEMENT IN ANTI-FRICTIONAL SHEAVES FOR PULLEY-BLOCKS, &c.

Specification forming part of Letters Patent No. 197,769, dated December 4, 1877; Reissue No. 8,097, dated December 16, 1879; application filed October 30, 1879.

*To all whom it may concern:*

Be it known that we, JACOB EDSON, of Boston, in the county of Suffolk, and WARREN H. HAYNES, of Sudbury, in the county of Middlesex, both in the State of Massachusetts, have invented certain new and useful Improvements in Anti-Frictional Sheaves for Pulley-Blocks, &c., of which the following is a full, clear, and exact description.

This invention relates, in one part, to an anti-frictional bushing or bearing for pulley-sheaves, shafts, axles, &c.; and it is composed of a series of rollers, a plate of annular shape, and a box or case.

The rollers intermediate of their length and the annular plate are relatively constructed to be interlocked with each other—that is, the rollers with the plate, or vice versa—and for the rollers to turn within and upon the plate, and the box or case on its interior is constructed to receive both said annular plate and the rollers which it carries, and to hold them both against escape at either end thereof, and together these several parts are relatively constructed and arranged so as to secure a series of rollers about and around a common central or axial line, each of which rollers is capable of revolving, and all of which are adapted to make, by their several peripheries, a bearing for a shaft or axle of proper size placed within the common central opening surrounded and bounded by the several rollers.

In addition to the above, this invention relates to pulley-sheave cases, and to their attachment to a boom or spar; and to that end it consists in providing one end of the case with a pin, which enters and fits so as to turn in the eye of a bolt that is secured to the boom or spar, &c., and with an arm protecting such eye and its connection with the boom, &c., against the entanglement of ropes, &c., thereon; and, again, it consists in providing the opposite end of the sheave-case with an eye fitting over a bolt that is secured to the boom or spar, &c., and projects from the said eye, and is curved so as to again meet the boom or spar, where it is also secured by a pin or otherwise to the boom or spar, &c., all substantially as hereinafter described.

Figure 1:
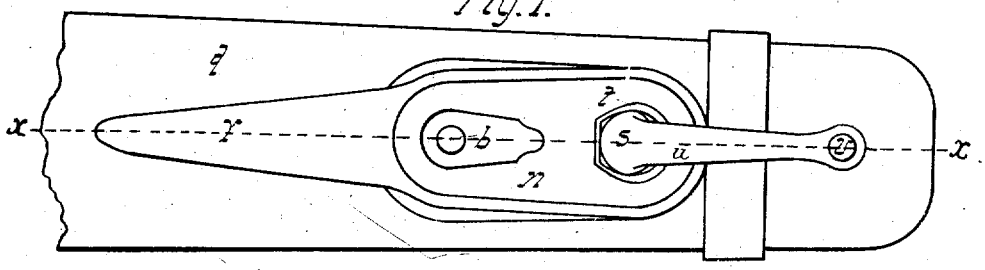
Figure 2:
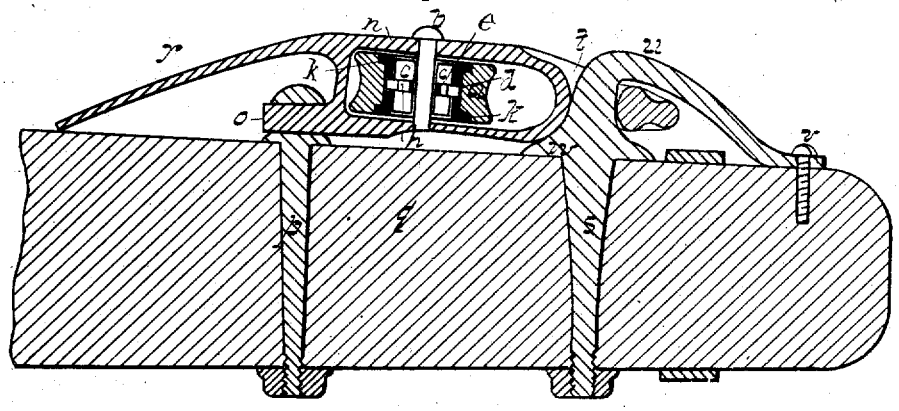
Figure 3:
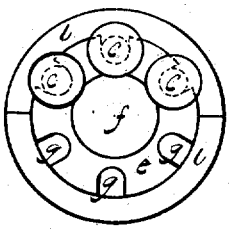
Figures 4, 5:
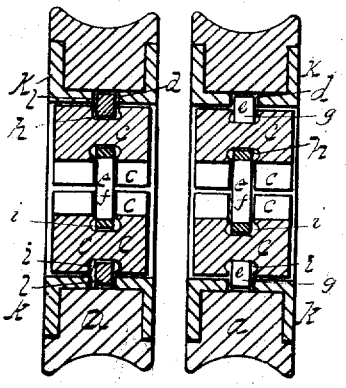
Figure 6:
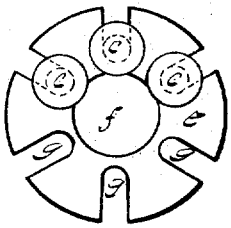

In the accompanying plate of drawings our anti-frictional bushing or bearing and our pulley-sheave case and its attachment to a boom or spar are shown, Figure 1 being a plan or face view of the same; Fig. 2, a central longitudinal section on line *x x*, Fig. 1; Fig. 5, a central transverse section of the pulley-sheave detached from its case; Fig. 6, a face view of the annular plate detached from the case or box, showing rollers interlocked therewith in end view; Fig. 3, a face view of an annular plate, showing a modification in its construction, and rollers interlocked therewith in end view; and Fig. 4, a central transverse section of the pulley-sheave having the modification of the annular plate, as shown in Fig. 3.

In the drawings, *a* represents a box or case in the form of a pulley; *b*, its central pin or shaft, and *ccc* a series of rollers located around said shaft, and bearing by their peripheries thereon; *d*, a groove or channel within and around the inner periphery of the pulley *a*, and midway between its two ends; *e*, a circular plate. This plate *e* has a central opening, *f*, and a series of radial notches or recesses, *g*, at its outer edge, and it fits by its outer edge within the interior peripheral groove *d* of the pulley, and it carries at each notch or recess *g* a roller, *c*, each of which rollers has a groove, channel, or recess, *h*, around its periphery, midway of its two ends, of suitable size and shape for the roller to enter a notch or recess and to receive the thickness of the plate *e*, and yet be free to turn within the notch and upon the plate.

The interior peripheral groove *d* of the pulley *a* is formed by means of two annular rings, *k k*, which are inserted from and secured at the opposite faces or sides of the pulley, (see Fig. 2,) and are of a proper width to leave the desired width of groove for the thickness of the annular plate. One of these rings *k* may be cast or otherwise made in one piece with the pulley, if so desired.

Parts constructed and arranged as above described obviously embrace a series of rollers, a plate of annular shape, and a box or case, and the rollers between their ends are interlocked with and are capable of turning with and upon the annular plate, which, in turn, is interlocked with the interior periphery of the box or case, whereby and through it the rollers are held against escape at either end of the box; and, furthermore, the rollers are arranged about a common central or axial line, and they are each and all capable of revolving, and make, by their several peripheries, a bearing for the shaft or axle pin *b* to turn within or upon, or for the pulley to turn around and upon the axle-pin *b*. The rollers also roll upon and against the inner periphery of the pulley *a*.

The inner portion or end of each roller groove or recess has a rounded recess or chamber, *i*, (see Fig. 4,) which gives the roller a strength greater than if the groove were square at each inner portion or end; and, again, this construction is important, as better castings can be obtained and castings which require less extra finish.

The modification in construction of the annular plate shown in Fig. 3 consists in having the plate *e* of such a size that the rollers will project beyond its outer edge, and in combining therewith another ring, *l*, at the outside of the edge of the plate *e*, which additional ring projects into the grooves of the rollers. This additional ring *l* may be made in one piece with the pulley or bearing *a*, if the latter be made in two parts, or as a separate and independent ring made solid or in halves, in either of which latter cases it is secured in place within the pulley or bearing *a* by means of the annular flanged rings *k k*, one or more.

This construction is merely the reverse of that previously described, as in the one case the interior of the pulley or bearing *a*, as it were, projects into the grooves of the rollers, and in the other case the pulley or bearing receives a projection from the grooves of the rollers; but in either case the interior of the pulley or bearing and the rollers are interlocked through the medium of a projection, such as a ring-plate, which lies within the grooves of the rollers and connects with the interior periphery of the pulley or bearing *a*.

The annular plate *e* is capable of turning in the groove of the pulley or bearing *a*.

The bearing or pulley *a* may be made in parts bolted together, and may be provided with one or more grooves, for one or more of the annular plates The axle *b* is secured to a sheave-case, *n*, open at its edges, and containing between its two sides the pulley *a* and its axle *b*. This sheave-case *n*, at one end, has a pin, *o*, which enters and fits the eye of a bolt, *p*, that passes through the boom *q* or spar, &c., and is secured by a nut, thus in a suitable manner being secured thereto, as is shown.

*r* is a tail-piece projecting from the same end of the sheave-case *n* as the pin *o*, and in a position to protect such pin and the bolt which it enters and fits against the entanglement of ropes, &c., thereon.

*s* is a bolt passing through the thickness of boom *q*, spar, &c., and secured thereto. This bolt, at one end, enters an eye, *t*, at one side, which eye is at an end of the sheave-case *n* opposite to its end having the pin *o*, and it passes through said eye and projects therefrom at the opposite end from which it entered, where it is curved, as shown at *u* in Fig. 2, and made to meet the boom, to which it is secured at *v*.

This construction and arrangement of parts make a very strong connection between the sheave-case and a boom or spar, while at the same time the sheave-case is free to swing sidewise in and on its bearings, and all entanglement of ropes or sails therewith entirely obviated.

*w* is a cheek-piece on bolt *s*, shaped to project under the sheave-case, and thus to prevent the sheave-case from turning, as aforesaid, upon its axis to a too great extent.

Having thus described our invention, what we claim, and desire to secure by Letters Patent, is—

1. An anti-frictional bushing or bearing composed of rollers, each having a peripheral groove or recess or recesses, of an annular plate or plates, constructed to interlock with the said peripheral grooves of said rollers, and of a box or case constructed interiorly to interlock with said annular plate or plates and rollers, and each and all relatively constructed and arranged together for a peripheral bearing and rotation of the rollers on a central shaft, pin, axle, &c., and for the retention of the rollers in the box or case, and otherwise for operation substantially as described, for the purpose specified.

2. The combination, with rollers *c*, each having a peripheral groove or recess or recesses, *h*, of an annular plate or plates, *e*, having notches or recesses *g* at the outer edge, and fitting at such recesses the said recesses of the rollers, and of a box or case, *a*, interiorly constructed for the interlock of the annular plate or plates *e* and rollers *c* therewith, substantially as and for the purposes described.

3. The combination, with rollers *c*, each having a peripheral groove or recess or recesses, *h*, and with an annular plate or plates, *e*, having notches or recesses at the outer edge to fit said recesses in said rollers, of a case or box interiorly provided with a peripheral groove or grooves to receive the outer edges of said annular plates *e*, substantially as and for the purposes described.

4. The box or case *a*, constructed interiorly with a ring or rings, *k k*, to leave an interior peripheral groove, *d*, substantially as and for the purposes described.

5. The combination, with an annular plate,

*e*, of rollers *c c c*, provided with peripheral recesses or grooves *h*, having rounded chambers *i i* at their inner ends, as set forth.

6. The combination, with the sheave-case *n*, having an eye, *t*, of the holding-bolt *s u*, adapted by its part *s* to enter said eye *t*, and, together with its part *u*, for attachment as herein described.

7. The sheave-case *n*, having an eye, *t*, and the holding-bolt *s u*, adapted by its part *s* to enter the said eye *t*, and also, as well as its part *u*, to be attached to a boom or spar, &c., in combination with the cheek-piece *w* of bolt *s u*, as set forth.

JACOB EDSON.
W. H. HAYNES.

Witnesses:
EDWIN W. BROWN,
W. S. BELLOWS.